US007693348B2

(12) United States Patent
Zavadsky et al.

(10) Patent No.: US 7,693,348 B2
(45) Date of Patent: Apr. 6, 2010

(54) METHOD OF REGISTERING AND ALIGNING MULTIPLE IMAGES

(75) Inventors: Vyacheslav Zavadsky, Ottawa (CA); Jason Abt, Kanata (CA); Mark Braverman, Toronto (CA); Edward Keyes, Ottawa (CA); Vladimir Martincevic, Kanata (CA)

(73) Assignee: Semiconductor Insights Inc. (CA)

( * ) Notice: Subject to any disclaimer, the term of this patent is extended or adjusted under 35 U.S.C. 154(b) by 1118 days.

(21) Appl. No.: 11/201,233

(22) Filed: Aug. 10, 2005

(65) Prior Publication Data

US 2006/0257051 A1 Nov. 16, 2006

(30) Foreign Application Priority Data

May 13, 2005 (CA) .................................. 2507174

(51) Int. Cl.
*G06K 9/32* (2006.01)
(52) U.S. Cl. ....................................... 382/294; 382/145
(58) Field of Classification Search ................. 382/145, 382/294; 345/425
See application file for complete search history.

(56) References Cited

U.S. PATENT DOCUMENTS

| 5,649,032 | A  | * | 7/1997 | Burt et al. ................... 382/284 |
| 5,694,481 | A  | * | 12/1997 | Lam et al. .................. 382/145 |
| 5,832,110 | A  | * | 11/1998 | Hull .......................... 382/168 |
| 6,097,854 | A  | * | 8/2000 | Szeliski et al. .............. 382/284 |
| 6,101,238 | A  | * | 8/2000 | Murthy et al. ................ 378/62 |
| 6,236,746 | B1 | * | 5/2001 | Chamberlain et al. ....... 382/145 |
| 6,249,616 | B1 |   | 6/2001 | Hashimoto |
| 6,359,617 | B1 | * | 3/2002 | Xiong ........................ 715/848 |
| 6,470,100 | B2 | * | 10/2002 | Horiuchi .................... 382/295 |
| 6,549,651 | B2 | * | 4/2003 | Xiong et al. ................. 382/154 |
| 6,597,818 | B2 | * | 7/2003 | Kumar et al. ............... 382/294 |
| 6,684,379 | B2 | * | 1/2004 | Skoll et al. ................... 716/11 |
| 6,757,445 | B1 | * | 6/2004 | Knopp ........................ 382/285 |
| 2003/0084409 | A1 | * | 5/2003 | Abt et al. ........................ 716/1 |
| 2005/0078881 | A1 | * | 4/2005 | Xu et al. .................... 382/294 |
| 2005/0110621 | A1 | * | 5/2005 | Hahn et al. ................. 340/435 |
| 2006/0110069 | A1 | * | 5/2006 | Tong et al. .................. 382/294 |

OTHER PUBLICATIONS

Heung et al. Construction and refinement of Panoramic mosaics with global and local alignment, IEEE,6010607, Jan. 4-7, 1998, pp. 953-958.*
Szeliski et al. Construction and refinement of Panoramic mosaics with global and local alignment, IEEE, 6010607, 1998, pp. 953-958.*

(Continued)

*Primary Examiner*—Samir A. Ahmed
*Assistant Examiner*—Jayesh Patel
(74) *Attorney, Agent, or Firm*—Ostrolenk Faber LLP

(57) ABSTRACT

A method of registering and vertically aligning multiply-layered images into a mosaic is described. The method comprises performing an iterative process of vertical alignment of layers into a mosaic using a series of defined alignment correspondence pairs and global registration of images in a layer using a series of defined registration correspondence points and then redefining the identified alignment correspondence pairs and/or registration correspondence points until a satisfactory result is obtained. Optionally, an initial global registration of each layer could be performed initially before commencing the alignment process. The quality of the result could be determined using a least squares error minimization or other technique.

41 Claims, 10 Drawing Sheets

OTHER PUBLICATIONS

Szeliski, Richard, "Image Alignment and Stitching," pp. 1-23.
Paige, Christopher, et al., "LSQR: An Algorithm for Sparse Linear Equations and Sparse Least Squares" ACM Transactions on Mathematics Software, vol. 8, No. 1, pp. 43-71, (1982).
Brown, L., "A Survey of Image Registration Techniques," ACM Computing Surveys, vol. 24, No. 4 (1992).
Rousseeuw, Peter, et al., "Robust Regeression and Outlier Detection," (2003).
Cantarella, Jason, et al., TSNNLS: A Solver for Large Sparse Least Squares Problems With Non-Negative Variables, pp. 1-7.
Matuszewski, Bogdan, et al., "Automatic Mosaicing with Error Equalisation of Non-Destructive Testing Images for Aerospace Industry Inspection," pp. 1-12.
Mian, Ajmal S., et al., "Automatic Correspondence and Global Registration of Range Images for 3D Modeling," Working Group III/2.
Xiao, Jiangjian, et al., "Layer-Based Video Registration," pp. 1-26.
Levin, Anat, et al., "Seamless Image Stictching in the Gradient Domain," pp. 1-12.
Macki, J. "Proceedings of the Sixth Annual Pims Industrial Problem Solving Workshop," Jun. 2002.
Braverman, Mark, "Vertical Layers Alignment," Aug. 2004.
Paige, Christorpher C., et al., "Algorithm 583 LSQR: Sparse Linear Equations and Least Squares Problems," ACM Transactions on Mathematical Software, Vo. 8, No. 2, pp. 195-209, (1982).

* cited by examiner

METHOD OF REGISTERING AND ALIGNING MULTIPLE IMAGES

FIELD OF THE INVENTION

The present invention relates to a method of registration and vertical alignment of multiple images, and more specifically to a vertical alignment method whereby two or more mosaicked images represent separate layers of a common object in a stacked overlay configuration.

BACKGROUND OF THE INVENTION

The creation of an image mosaic is a powerful analytical tool when observing large areas in fine detail. It is often necessary, when tracking ice drifts or the movement of geographical features, to mosaic multiple photographs with a common resolution, into a single image that shows the entire area of interest. These mosaics typically occur only in two dimensions, where the images are mosaicked only along the width and length of the image.

Integrated circuits (ICs) are sometimes analysed using similar techniques, in order that the IC may be reverse-engineered or examined for quality control. ICs are made up of multiple layers of semiconductor and metal, overlaid on top of one another in order to create interconnected circuitry. When analyzing these devices, multiple images of each layer of the IC are collected in a matrix pattern of rows and columns and then "stitched" together to form a mosaic. In performing the analysis, one can examine the mosaic of each layer of the IC, and understand the interconnections of the overall circuit. Alternatively, to save time, one can overlay partially transparent mosaics of each layer to more clearly understand the interconnections of the overall circuit. However, as there will be small errors between the layers in the alignment of the overlaid images in each mosaic, this may introduce errors in the analysis.

A procedure called pair-wise registration, which is a well-known technique in the art, is used to digitally stitch together the images on a common plane by minimizing registration errors. Pair-wise registration accomplishes this through calculation of the relative image coordinates of a pair of images, and the selection of a single pair of corresponding points between the two images. More images may be pair-wise registered by applying a similar technique to another image and the previously registered image pair. Such a registration can be performed by techniques described in the paper "A survey of image registration techniques" by L. Brown, *ACM Computing Surveys*, Vol 24, Issue 4, 1992, incorporated by reference herein.

Global image registration allows for the finding of relative coordinates of overlapped images, in order to compensate for errors introduced by the image acquisition system. When the images are globally registered, all of the images to be registered are manipulated until a registration is achieved that minimizes and distributes the registration errors between them and across each image. This can be done by, for example, using least squares energy minimization. The details of least squares based energy minimization are given in Chapter One of the *Proceedings of Sixth Annual PIMS Industrial Problem Solving Workshop*, 2002, Pacific Institute for Mathematical Sciences, which is incorporated by reference herein.

However, the prior art does not address several issues. In some cases, there is not enough information in the overlapping section of the images to define relative coordinates with enough precision. Alternatively, there may be no overlapping section, due to issues with the image acquisition system, or erroneous pair-wise registration. The presence of such erroneous relative coordinates adversely affects the quality of registration of large numbers of nearby images, as the error is distributed by the energy minimization procedure across the image.

Also, when different mosaics, showing the same area but in relation to different layers, are registered independently of one another, it may happen that error will be accumulated such that vertical alignment of these two mosaics would be impossible without changing the way they were registered, which the prior art does not consider.

As well, in the prior art, there is no way to collect human operator feedback or integrate inspection results as to the fit of the registration. Thus, should the results of the energy minimization approach be unacceptable, an operator may have to move a large number of images manually.

Therefore, a need exists in the art for an image-mosaicking algorithm that will compensate not only for registration errors within a single layer, but also alignment errors across multiple layers of the same area in an overlay configuration that will allow for inspection and correction of both the registration and alignment of the constituent images.

SUMMARY OF THE INVENTION

The present invention provides an improved registration method to compensate for alignment errors in multiple layer mosaicking applications.

According to a first broad aspect, the present invention provides a method of creating a horizontally registered and vertically aligned multiple-layered mosaic of images of an object, comprising the steps of: a) for each layer of detail of the object to be imaged: i) capturing the detail of the layer in a series of overlapping captured images; ii) performing pair-wise registration of the captured images of the layer into a mosaic; and iii) performing global registration of the mosaic of the layer, into an optimised mosaic layer; b) identifying at least one alignment correspondence pair, located on an image on a first optimised mosaic layer and on at least one image on a separate optimised mosaic layer, so that the first layer may be more accurately aligned with the other layers using the at least one alignment correspondence pair; and c) iteratively:

i. Performing alignment and global registration of all of the optimised mosaic layers into a substantially aligned mosaic, using the identified alignment correspondence pairs and the registration correspondence points associated with each optimised mosaic layer; and ii. Redefining the identified alignment correspondence pairs;

until the alignment of the layers is optimized.

According to a second broad aspect, the present invention provides a method of creating a horizontally registered and vertically aligned multiple-layered mosaic of images of an object, comprising the steps of:

a. Capturing the detail of each of the layers in a series of overlapping images;

b. Performing pair-wise registration of the captured images of each of the layers into a mosaic;

c. for a plurality of layers of detail of the object to be imaged:

i. identifying at least one registration correspondence point, each located on two images, so that a captured image may be more accurately registered with the other images on the same layer using the at least one registration correspondence point and identifying at least one alignment correspondence pair, located on an image on a first layer and on at least one image on a different one of the plurality of layers, so that the first layer may be more accurately aligned with the other layers using the at least one alignment correspondence pair;

ii. iteratively:

A. performing global registration of the captured images of each of the plurality of layers into a mosaic, using the identified registration correspondence points for the layer and performing alignment of all of the plurality of layers into a mosaic, using the identified alignment correspondence pairs;

B. redefining the identified registration correspondence points for each of the plurality of layers and the identified alignment correspondence pairs;

C. until the registration and alignment of the plurality of layers is optimised; and adding at least one layer to the plurality of layers;

until the alignment of all of the layers of detail of the object is imaged and optimized.

According to a third broad aspect of an embodiment of the present invention, there is disclosed a method of creating a horizontally registered and vertically aligned multiple-layered mosaic of images of a portion of an object, comprising the steps of:

(a) for each layer of detail of the portion of the object to be imaged; (i) capturing the detail of the layer in a series of captured images; (ii) performing pair-wise registration of the captured images of the layer into a mosaic; (iii) identifying at least one registration correspondence point, associated with at least two images; (iv) performing global registration of the mosaic of the layer, into an optimized mosaic layer using the identified registration correspondence points associated with the layer; and (v) redefining the identified registration correspondence points for the layer;

(b) Identifying at least one alignment correspondence pair, located on an image of a first optimised mosaic layer and on at least one image on a separate optimised mosaic layer; and (c) Iteratively:

(i) performing alignment and global registration of all of the optimised mosaic layers into a substantially aligned mosaic, using the identified alignment correspondence pairs associated with each optimized mosaic layer; and (ii) redefining the identified alignment correspondence pairs and the identified registration correspondence points;

until the alignment of the layers is optimized.

The registration method of the present invention may further comprise a notification means to inform a human operator of the need to inspect outliers (points of correspondence which fall outside of the norm) or low confidence pairs and apply user-defined registration correspondence points and/or alignment correspondence pairs.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

For purposes of explanation, specific embodiments are set forth to provide a thorough understanding of the present invention. However, it will be understood by one skilled in the art, from reading this disclosure, that the invention may be practised without these specific details. Moreover, well-known elements, devices, process steps and the like are not set forth in detail in order to avoid obscuring the scope of the invention described.

Figure 1:
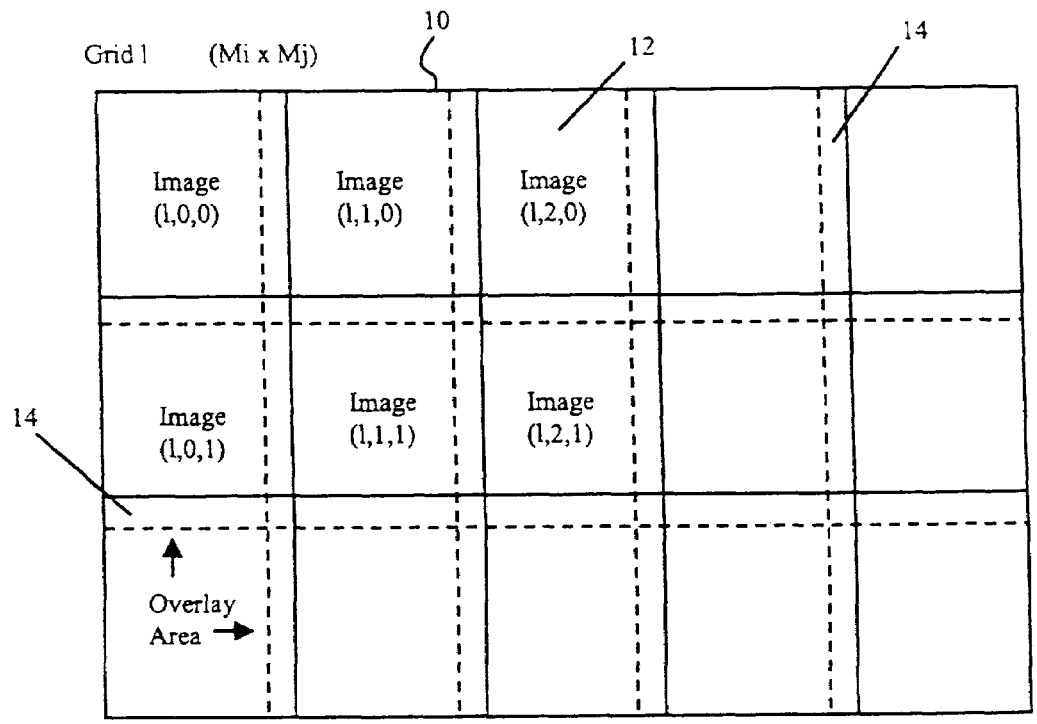
FIG. 1 (PRIOR ART) is a representational view of a matrix of images in a row and column configuration FIG. 2 (PRIOR ART) is a partial representational view of two overlaid layers of the type shown in FIG. 1.

In cases where a substantially planar object is to be imaged and the viewing area of the imaging device is smaller than the object area, the imaging may for example, be done in a three-dimensional matrix of images in the form of a plurality of layers 10, each comprising a matrix of smaller images corresponding to the viewing area of the imaging device, as shown in FIG. 1. An imaging system (not shown) designed for gathering images in such a fashion and known to those having ordinary skill in this art, captures each image and assigns it a set of coordinates. If each image 12 is represented by a vector (k, i, j) where k is the layer number, i is the column number and j is the row number of the image within the matrix corresponding to the layer, then the image will be assigned coordinates $\theta_{(k,i,j)}$ as defined by the imaging system used. The images may slightly overlap 14, in order to provide some points of reference for registering the images having a common column and/or row together.

The coordinate space defined by the imaging system may depend on the specific settings used by the imaging system. For example, one system may define the scope of the image taken in terms of a global (x,y) coordinate reference point corresponding to a known point within the viewing area of the imaging device, and a magnification level to be applied to all images in the matrix. Alternatively, the imaging system may define the image scope by the global (x,y) coordinate reference point and a rotation or an affine transform (a transform of coordinates needed to arrive at a new point). For example, one could introduce a coordinate system with the origin in the center of the viewing area. The affine distortion transformation could be denoted by:

$$T(x)=Mx+(s_X,s_Y). \qquad (1)$$

Since the distortion is small, M should be close to the identity matrix $I_2$. We denote $M=I_2+E$, where E is a small matrix. Those having ordinary skill in this art will nevertheless readily recognize that different ways of defining the coordinate space defined by the imaging system may be used without departing from the scope of the invention.

Unfortunately, imaging systems are not perfect, and may define $\theta_{(k,i,j)}$ with some error.

Being a physical process, image capture inherently introduces distortions in the registration, which may be sufficient to affect the correctness of the overall mosaic. Such distortions include shifts, rotations, dilations and shearing or skewing.

Shifts are due to imperfections in the positioning of the microscope, which causes one layer of images to be slightly shifted relatively to another, even though nominally they are at the same location.

For example in the context of an attempt to image an integrated circuit, the lowest wiring layer may be denoted $M_1$, the second lowest wiring layer by $M_2$ and so on. The layer of vias connecting $M_1$ to $M_2$ could be denoted by $V_1$, and the vias layer connecting $M_2$ to $M_3$ by $V_2$ etc. During the data capture process, using a microscope, two dimensional images of $M_i$ and $V_i$ are obtained together, because a metal layer $M_i$ appears with the vias $V_i$ on top of it. Thus, notionally, the images for $M_i$ and $V_i$ should be aligned perfectly. The objective is in reality, to align $V_i$ by to $M_{i+1}$ in a perfect or close to perfect way.

Thus, with a shift, it is possible that the portion of $V_i$ considered, denoted by $v_i$, is shifted slightly relative to the portion of $M_{i+1}$ considered, denoted by $m_{i+1}$, even though nominally they are at the same location. We denote the shift of $v_i$ relative to $m_{i+1}$ needed to correct the situation by $s_X$ in the x-direction and $s_y$ in the y-direction. In our specific example, both $s_X$ and $s_Y$ should be less than forty pixels. This estimate will vary substantially depending on the imaging system, focus level, resolution, and the field size of the image. The forty pixel estimate is based on an image having a field size 4096 pixels.

Rotations are similar to shifts in that it is possible that $V_i$ is slightly rotated relatively to $m_{i+1}$. We denote by $\alpha$ the angle by which one would need to rotate $V_i$ to improve the situation. $\alpha$ is measured counter-clockwise. Typically, $\alpha$ is at most a few degrees.

Although the nominal magnification for an imaging system would be the same for $V_i$ and $M_{i+1}$, the actual magnification might vary slightly. Thus, $V_i$ might have to be dilated slightly to fit $M_{i+1}$. We denote the factor by which $V_i$ should be dilated in the x-direction to fit $M_{i+1}$ by $k_X$ and in the y-direction by $k_Y$. The values $k_X$ and $k_Y$ may not necessarily be equal. Typically, such dilation or scaling errors would be in the order of a few percent each.

Shearing or skewing constitutes a non-linear distortion in either the x- or y-direction of the image. Typically, the shear would be less than one percent in either direction.

The combination of shifts, rotation, dilations and shear gives rise to a general affine transform, a (2×2 Matrix) plus a shift vector.

The error occasioned by the vagaries of the image capture process, such as lens distortion, rotation of the image due to a change in field strength of the electromagnetic coils, dilation or contraction due to changes in gain of the scan coils, thermal drift or stage movement of the sample, can be minimized by selecting identifiable registration correspondence points on the overlapping portions of adjacent images within the matrix and performing image registration on the matrix of images in light of the registration correspondence points, using an error minimization algorithm, such as least squares energy minimization.

Least squares energy minimization is typically used to calculate $\theta'_{(k,i,j)}$ using the registration correspondence points and the existing coordinates $\theta_{(k,i,j)}$. Other error minimization algorithms could be used, such as are known by those having ordinary skill in this art.

However, as the registration is done independently of the consideration of vertical alignment with adjacent superior or inferior layers, the error in alignment can accumulate, increasing the chance of misalignment. This is illustrated in FIG. 2, where a misalignment problem has occurred, as the registration errors on adjacent layers increase cumulatively but in opposing directions.

Figure 2:
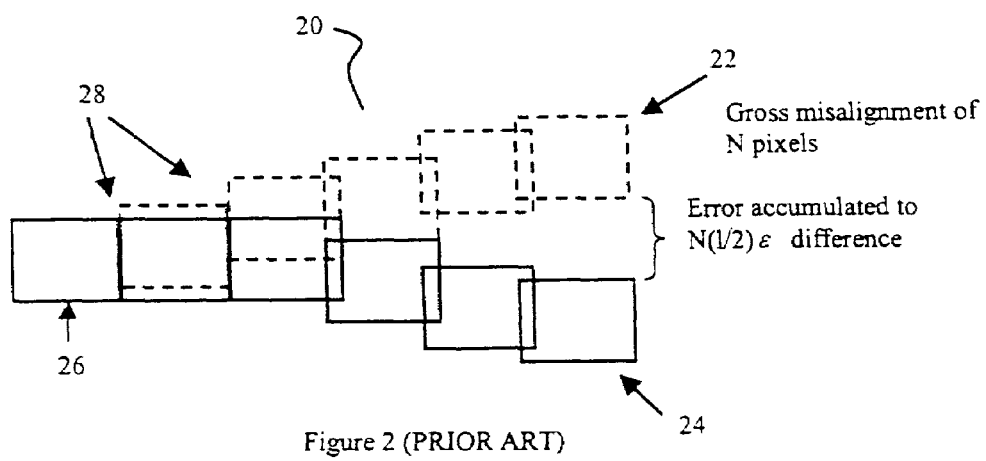

As further illustrated in FIG. 2, when two layers 22 and 24 of images are aligned, the first images of each layer may be ideally registered 26, however, even small (half pixel) registration errors 28 on each layer can accumulate into a substantial misalignment over the course of a large area. Although a more detailed probabilistic study would be appropriate, a simple Brownian motion model estimate of the magnitude of the inter-layer alignment error $E_A$ would be:

$$E_A=\epsilon\sqrt{2\cdot\max(M,N)} \qquad (2)$$

where $\epsilon$ is the visible imperfection in the overlap area in number of pixels and M is a column and N is a row within the layer's matrix and max (M, N) identifies the magnitude of the misalignment of the matrix element that has the maximum misalignment between the layers in question.

Figure 3:
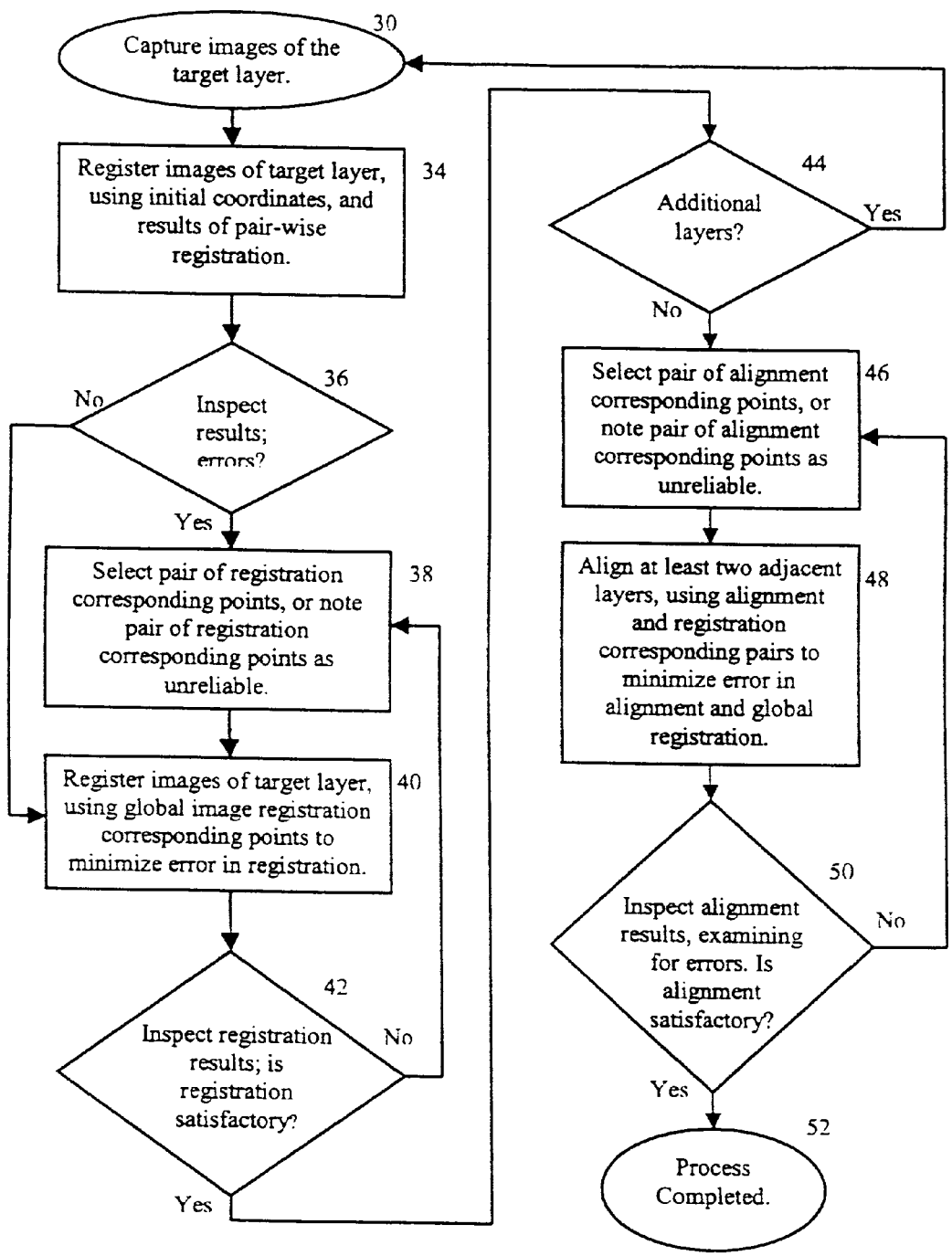
FIG. 3 is a flow chart illustrating the steps for registering a number of images into layers and aligning a number of vertical layers while searching for alignment errors, in accordance with a first aspect of the present invention.

The logic flow of a first preferred embodiment of the present invention is described in the flow chart of FIG. 3. The flow chart details steps designed to iteratively minimize the registration and alignment errors in creating a vertically aligned mosaic of two or more layers of images.

Images of a portion of the target object are captured for each layer individually 30.

Those having ordinary skill in this art will recognize that the entirety of the object of the object need not be imaged. Nevertheless, it is possible that the entire is to be imaged. To cover this possibility the term "portion" is used in this specification in a sense that may include the entirety of the object.

Alternatively, one may choose to capture more than one type of image, using different sensors, substantially simultaneously, of the portion of the target object. For example, one could capture thermal information and then standard visual information, in order that the two may be overlaid for analysis. In such case, each type of image would constitute a separate layer in need of alignment with the remaining layers.

After the images are captured for one layer, a first attempt is made at pair-wise registering a layer of a multiple-layered image area 34 using pair-wise registration, or such other registration technique as may be known to those having ordinary skill in this art. This may be accomplished by the image capturing system storing the captured images in a matrix corresponding to the notional parameters of the viewing area and applying pair-wise registration using common overlapping structures, such as gray areas, as notional clusters of registration correspondence points.

The steps of registration and error minimization as performed in step 34 are now further illustrated. Let us consider the case when two matrices are of the same size M×N; and the coordinate system is an affine transform:

$$\theta_{(k,i,j)} = \begin{pmatrix} a_k & b_k \\ c_k & d_k \end{pmatrix}, \begin{bmatrix} x_{k,i,j} \\ y_{k,i,j} \end{bmatrix}, \quad (3)$$

where it is known a priori that the matrix component $$\begin{pmatrix} a_k & b_k \\ c_k & d_k \end{pmatrix}$$

of the transform is the same for all images in the layer k.

Let us further assume that we have p pairs of points of correspondences $(k_t,i_t,j_t,x_t,y_t),(k_t',i_t',j_t',x_t',y_t')$, t=1, . . . , p, that suggest that the point $(x_t,y_t)$ on the $(i_t,j_t)$ image of the layer k should match the point $(x_t',y_t')$ on the $(i_t',j_t')$ image of the layer k'.

Thus, the error against pair-wise registration information is given by:

$$r_z = x_{k,i,j} - x_{k,i+1,j} - \nabla_{k,i,j}^H x \quad (4)$$

where:
$r_z$ is the error;
z is a separate index for error terms; and
$\nabla_{k,i,j}^H, \nabla_{k,i,j}^V$ are relative coordinates found by pair-wise registration for horizontal and vertical overlap areas respectively.

Further errors for pair-wise registration data are given by:

$$r_z = y_{k,i,j} - y_{k,i+1,j} - \nabla_{k,i,j}^H y,$$

$$r_z = x_{k,i,j} - x_{k,i,j+1} - \nabla_{k,i,j}^V x,$$

$$r_z = y_{k,i,j} - y_{k,i,j+1} - \nabla_{k,i,j}^V y \quad (5)$$

The results of the pair-wise registration attempt 34 are then analysed in order to identify statistical outliers and general errors in the registration 36. Typically, this may be a manual visual inspection. However, the examination of the results of the registration attempt could be automated. For example, one could use a computer algorithm with the following parameters to assess the reliability of a particular local matching:

a. The amount of vias in the particular patch—one cannot base judgment on the correct shift of the patch if there are no vias or just one or two vias in it, which could constitute noise entries;

b. The amount of matching after the shift—ideally, this would be 100%, but in practice should be almost to this level, which suggests virtually all of the vias are matched; and c. The variance and the solution—one would want the matching to be unique or near unique. Otherwise one would not know the different optimal matchings is the appropriate one. For example, if the patch happens to be above a wide metal bus, all the matchings would be "good" and one would have no way of knowing which one to choose. In the case where the variance is too large, it may be preferable to ignore the particular patch and look for a better one.

One could systematically look for patches that would provide a reliable matching. For example one could look beginning in the upper-left, upper-right and bottom-left corners of the overall matrix. If one of these searches fails one could look from the bottom right corner.

The objective would be to find three different reliable local matchings. One starts in different corners in order that the matchings be kept far apart from each other in order to optimize the three point matching.

One looks for all of the possible shifts by the amount not exceeding D (maximum number of pixels between the actual location of the via in the image and where it should be) in each direction, to find the minimum or minima of the energy function. If the patch is considered reliable in accordance with the criteria above, its corner could be used as one of the points in the three-point matching.

Once three patches have been reliably locally matched, the registration could be accomplished by a three-point matching, which maps their respective upper-left corner to their positions, as modified by the shifts identified by the energy function.

$M_{i+1}$ may be generated as a black and white bitmap with a brightness of 255 whenever there is metal on layer $M_{i+1}$ and zero everywhere else. $V_i$ could be a black and white bitmap with a brightness of 255 whenever there is a via. It is a design rule that any vias on the $V_i$ layer must be connected to metal on both the $M_i$ and the $M_{i+1}$ layers. An ideal solution, therefore would be one where each via in $V_i$ is matched to a metal in $M_{i+1}$.

Because in real life, there may not be a perfect solution, as discussed above, a penalty is applied to the solution for every unmatched via. The objective is to find the solution with the lowest number of penalty points. The penalty can be summarized in the following table:

| Vias in $V_i$ | Metal in $M_i$ | Penalty? |
|---|---|---|
| No | No | No |
| No | Yes | No |
| Yes | No | Yes |
| Yes | Yes | No |

Ideally, one would want to minimize the distortion between the vias and the metal to which they are matched. However, such distortion is not an observable parameter. Rather, an energy function, defined as the product of the number of unmatched vias and the number of all vias, is an observable parameter. Thus, one could use the energy in order to assess the quality of the solution.

The energy function of a solution is a sum of all penalties for individual pixels/vias. One of the reasons that one might never get a perfect solution is the possibility of false vias in $V_i$ (i.e., the via appears in the image but is not really in existence), and omissions of metal from $M_{i+1}$.

A perfect solution, or a solution with just a couple of pixels of distortion will have an almost zero energy while other solutions would probably have a high energy.

Different energy functions could be used to minimize overall errors. The simplest one is weighted least squares formulation:

$$E = \Sigma w_z r_z^2 \to \min \quad (6)$$

where $w_z$ is a non-negative weight assigned to the seams or edges of two images which are to be registered or aligned, according to a reliability estimate in which more reliable seams have substantially higher weights and user input.

Optionally, one could improve the overall performance of the algorithm by running it several times with different parameters and to choose the best solutions from the series of runs. We have found that changing the minimum number of vias per patch, the amount of matching after the shift and the variance in the solution will not typically affect the outcome of the computation in most cases, since those parameters only become relevant with problematic patches with poor quality parameters. Rather, the most important parameter appears to be the basic patch size. We have found that properly selecting the size is the best outcome and provides good results.

Whichever method is used, the set of errors detected could lead to the identification of certain correspondence registration points between image pairs thought to be useful in increasing the accuracy of the registration attempt. Alternatively, certain existing registration correspondence points may be discarded as constituting an outlier or an error 38. As the initial registration attempt did not rely on the identification of any specific registration correspondence points, these could only be discarded after the second (global) registration attempt.

For a user-defined registration correspondence point associated with a number of images on the same layer, the error terms are defined by the equation:

$$\begin{pmatrix} r_z \\ r_{z+1} \end{pmatrix} = \begin{pmatrix} x_{k_t,i_t,j_t} \\ y_{k_t,i_t,j_t} \end{pmatrix} + \begin{pmatrix} x_t \\ y_t \end{pmatrix} - \begin{pmatrix} x_{k'_t,i'_t,j'_t} \\ y_{k'_t,i'_t,j'_t} \end{pmatrix} - \begin{pmatrix} x'_t \\ y'_t \end{pmatrix} \quad (7)$$

The matrix part of the affine transform is not present in the error equations for one layer and is not computed during step 36 of the first embodiment shown in FIG. 3.

Certain registration correspondence points are then identified, which are thought to keep the error to a minimum 38. Each registration correspondence point is found on or associated with at least two images in the layer. We have found that, on average, one registration correspondence point associated with both of the two images in the layer for every nine images proves sufficient in this regard. Indeed, by deconstructing sample registration approaches, using a matrix of 160 images, we have found that satisfactory registration occurred in the best case with a total of only 7 registration correspondence points. In the worst case, registration required 30 such registration correspondence points.

Thereafter, a global registration attempt is performed, using the newly modified set of registration correspondence points 40. The registration attempt is not done on a pair-wise basis, as was the case in the original registration attempt, but on a global basis wherein any of the images in the layer could be moved relative to the others in order to provide a more satisfactory result. The result of the registration is determined by applying an energy minimization approach, such as a weighted least squares energy minimization.

The weighted least squares energy minimization problem can be efficiently solved by publicly available software LSQR, described by C. C. Paige and M. A. Saunders, *LSQR: An algorithm for sparse linear equations and sparse least squares*, TOMS 8(1), 43-71 (1982), incorporated by reference herein.

Outlier terms in the energy function can be found by the methods described in *Robust Regression and Outlier Detection* by Peter J. Rousseeuw, Annick M. Leroy, 2003 incorporated by reference herein. Overlapping areas corresponding to such areas can be brought to the operator for inspection.

Another energy function can be given by $$e_z = w_z r_z^2, E = e_{(95\%)} \rightarrow \min \quad (8)$$

where $e_{(95\%)}$ is the 95% order statistic of the remaining useable correspondence data.

The phrase "order statistic" refers to statistical methods that depend only on the ordering of the data and not on their numerical values. So, for instance, the mean, or average of the data, while easy to compute and very important as an estimate of a central value, is not an order statistic. The mode (most commonly occurring value) also does not depend on ordering, although the most efficient methods for computing it in a comparison-based model involve sorting algorithms. The most commonly used order statistic is the median, the value in the middle position in the sorted order of the values.

This formulation provides the advantage of robustness over ordinary least squares energy minimization, in that a certain percentage of erroneous data or user input will not affect the results. Such a problem can also be solved by the methods described in *Robust Regression and Outlier Detection* by Peter J. Rousseeuw, Annick M. Leroy, 2003.

Another formulation would be to group the data into two or more groups according to their reliability level, then minimizing the weighted least squares energy, taking into the account the most reliable group, and minimizing the energy in the least reliable groups, subject to a minimal increase of the energy in the most reliable groups. Such a procedure can be implemented using publicly available TSNNLS software, described in *TSNNLS: A Solver for Large Sparse Least Squares with Non-Negative Variables* by Jason Cantarella, preprint of Department of Mathematics and Computer Science, Duquesne University, incorporated by reference herein.

To analyse the results of pair-wise registration for errors as described in step 36, one may split the overlapping area into two or more parts, and compute the relative image coordinates $\nabla \theta_{(l,i,j)}$ of each part independently.

Figure 10:
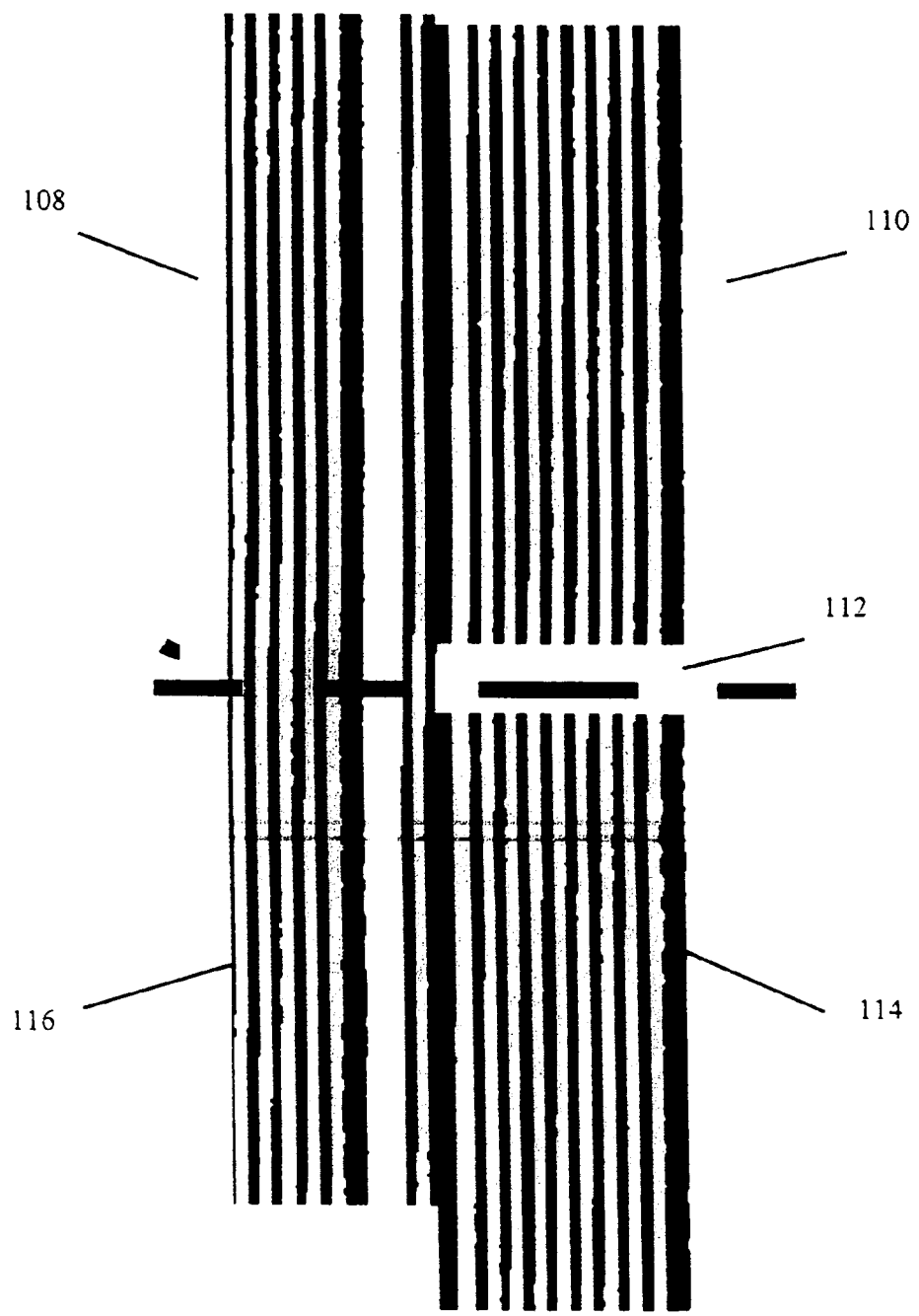
FIG. 10 is a mosaic photograph of four images that are missing an overlapping area.

In the case shown in FIG. 10, the overlap area does not contain enough information to reliably compute relative coordinates. Thus, there will be a substantial difference between each divided section's relative coordinates. This situation can then be brought to the attention of an operator for manual inspection, or alternatively, can be deemed as a non-reliable image pair and discarded before the next registration attempt with error minimization.

Once the error associated with the latest global registration attempt has been calculated and evaluated 42, the set of registration correspondence points will be further adjusted 38 and then a further global registration attempt made 40.

This process of adjusting the set of registration correspondence points 38, performing a global registration attempt using the adjusted set of registration correspondence points 40 and inspecting the results of the registration attempt 42 could be iteratively repeated until a satisfactory level of registration is ultimately achieved.

Once a layer of images has been satisfactorily registered, the entire process is repeated for a different layer.

Once all of the layers have been satisfactorily registered, the process of vertical alignment may be commenced.

Figure 11:
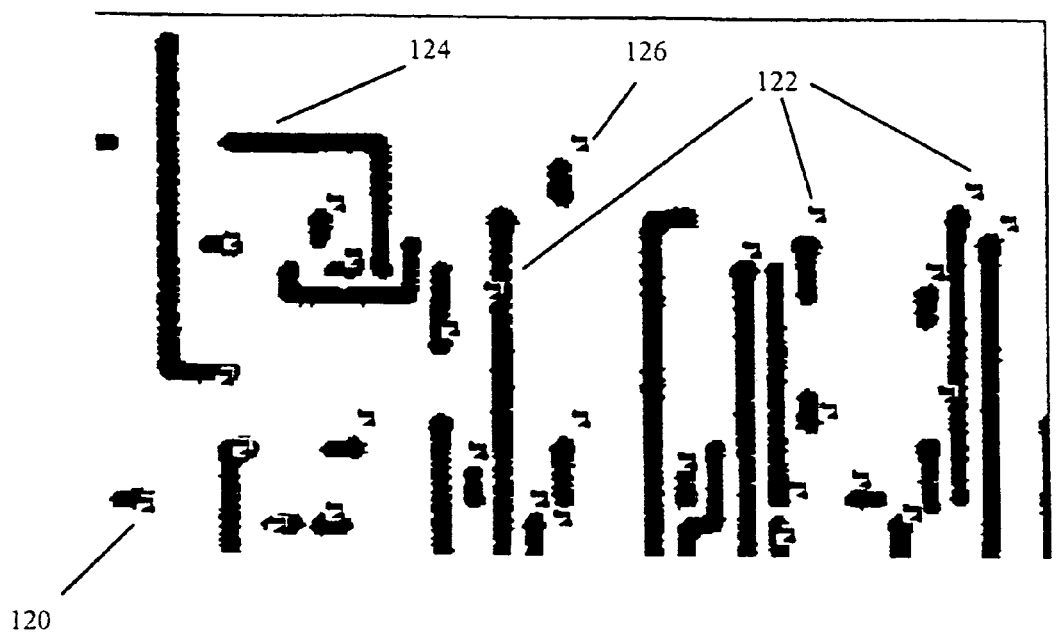
FIG. 11 is a photograph of a layer of metal from an integrated circuit, showing the presence of vias.

In order to vertically align the various layers, at least one pair of alignment correspondence points must be selected between each adjacent layer pair 46. These points of alignment correspondence are points that represent the identical space between at least two adjacent layers. There are several methods of selecting points of alignment correspondence that could be used by those having ordinary skill in this art. First, a human operator could manually identify points of correspondence between the adjacent layers. Second, markers may be inserted into the layers, before they are imaged, to be used as points of correspondence during the alignment stage. Such markers must be visible between layers. Third, a computer could be configured to automatically select points of correspondence using image recognition software. In IC applications, for example, as discussed above, it is known that via interconnects visible on the bottom layer should go to metallization areas on the top layer. Thus, a template of a via pattern can be selected on one layer, and a search initiated on an adjacent layer, for this template. This provides better points of correspondence between the adjacent layers. When performing this template matching, it is preferable to use a template of a small area, in order to ensure that all vias arrive at a destination on the adjacent layer. Occasionally vias are intentionally left "floating" between layers and do not connect to the adjacent layer. By using a small template, the computer can be directed to perform a rough alignment. FIG. 11 shows vias on one layer being roughly matched to vias on an adjacent layer.

Once one layer is associated with at least one other layer by at least one selected alignment correspondence pair, a combined alignment and global registration attempt is made by computing global coordinates on all layers substantially simultaneously using an error minimization technique, such as least squares energy minimization 48. This results in both alignment and global registration of the images.

As in the steps above, the results of the alignment attempt 50 are then analysed in order to identify statistical outliers and general errors in the alignment 46. Typically, this may be a manual visual inspection. However, the examination of the results of the alignment attempt could be automated. Whichever method is used, the set of errors detected could lead to the identification of certain additional alignment correspondence pairs thought to be useful in increasing the accuracy of the alignment attempt. Alternatively, during subsequent iterations, certain existing alignment correspondence pairs may be discarded as constituting an outlier or an error 46.

This process of adjusting the set of alignment correspondence pairs 46, performing a combined alignment and global registration attempt using the adjusted set of alignment correspondence pairs and the existing set of registration correspondence points 48 and inspecting the results of the registration attempt 50 could be iteratively repeated until a satisfactory level of alignment and global registration is ultimately achieved. Generally, the more the planes of the image mosaics are misaligned, the more alignment correspondence pairs will be required. As such, the method may be adjusted to permit greater degrees of freedom (such as degrees of movement or rotation of individual images) in order to accurately minimize the overall alignment and registration errors.

By allowing the registration of a particular layer to be recalculated during the alignment process, the problem demonstrated by FIG. 2, in which registration of different layers tends to diverge can be avoided. Rather, a relatively suboptimal registration of the two layers will be chosen over optimal registrations in order to minimize the overall error, taking into account the need to achieve a satisfactory alignment as well.

The alignment in step 48 is substantially different from the registration performed in step 34. The equation for the alignment correspondence pair error is given by the following equation:

$$\begin{pmatrix} r_z \\ r_{z+1} \end{pmatrix} = \qquad (9)$$

$$\begin{pmatrix} a_k & b_k \\ c_k & d_k \end{pmatrix} \times \begin{pmatrix} x_{k_t,i_t,j_t} \\ y_{k_t,i_t,j_t} \end{pmatrix} + \begin{pmatrix} x_t \\ y_t \end{pmatrix} - \begin{pmatrix} a'_{k_t} & b'_{k_t} \\ c'_{k_t} & d'_{k_t} \end{pmatrix} \times \begin{pmatrix} x_{k'_t,i'_t,j'_t} \\ y_{k'_t,i'_t,j'_t} \end{pmatrix} - \begin{pmatrix} x'_t \\ y'_t \end{pmatrix}$$

The energy function has to be optimized with respect to the variables $$\theta_{(k,i,j)} = \begin{pmatrix} a_k & b_k \\ c_k & d_k \end{pmatrix}, \begin{bmatrix} x_{k,i,j} \\ y_{k,i,j} \end{bmatrix},$$

substantially simultaneously. This renders the optimization problem non-convex and therefore harder to solve. In practice, an iterative algorithm can be used to approximate a solution, when $$\begin{pmatrix} a_k & b_k \\ c_k & d_k \end{pmatrix}$$

is minimized with fixed $$\begin{bmatrix} x_{k,i,j} \\ y_{k,i,j} \end{bmatrix}$$

using the same methods as described in step 34. Then, when $$\begin{bmatrix} x_{k,i,j} \\ y_{k,i,j} \end{bmatrix}$$

is modified with fixed $$\begin{pmatrix} a_k & b_k \\ c_k & d_k \end{pmatrix},$$

the solution converges to an acceptable solution in just a few repetitions.

Thus, in this first embodiment, the registration process occurs sequentially before alignment is attempted.

Figure 5:
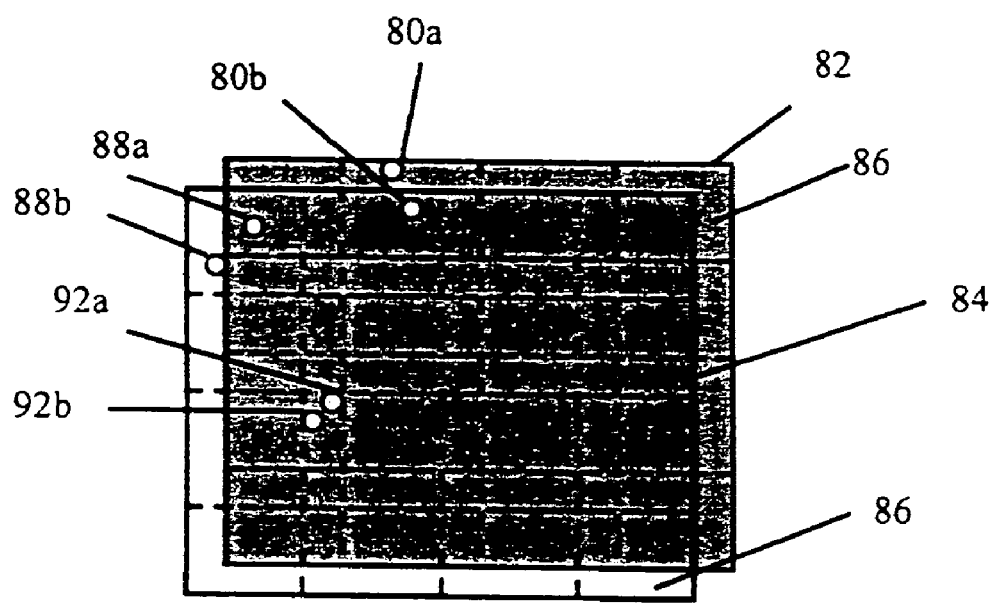
FIG. 5 is a representational view of two layers of image grids having points of correspondence between them in accordance with an embodiment of the present invention.

By way of example, FIG. 5 illustrates two overlaid layers 82, 84 in a matrix configuration of overlapping images 86 (for clarity, regions of overlap are not shown). For ease of explanation, it is assumed that the images 86 have already been independently registered, and relative coordinates have been defined. The layers 82, 84 include points of correspondence defined as pairs 80*a*, 80*b*, 88*a*, 88*b* and 92*a*, 92*b*, which may be selected by the human operator, or alternately computer selected based on a number of image recognition techniques as earlier described. Points 80*a*, 88*a* and 92*a* are located on layer 82 and points 80*b*, 88*b* and 92*b* are located on layer 84. The process of this first embodiment uses these correspondence pairs to align the two mosaicked image layers.

It is initially assumed that the points of registration and alignment correspondence are correct. After the system calculates the global coordinates for the two mosaicked image layers, it may be determined by inspection that the images are not correctly aligned. Before selecting new alignment correspondence pairs, the initial set of alignment correspondence pairs is inspected. In this case, it may be observed that points 80*a* and 80*b* do not actually correspond. Thus, these points are removed from the list of alignment correspondence pairs and new pairs may be identified. Another alignment and global registration attempt is performed, and the alignment correspondence pairs are again inspected. This process continues until there is satisfaction that the two layers are satisfactorily aligned and registered.

A second embodiment of the present invention is described in detail with reference to the flow chart illustrated in FIG. 4. The steps describe the algorithm used to vertically align two or more layers in a stacked overlay configuration representing the same area. In this second embodiment, the registration and alignment steps are performed substantially simultaneously. In effect, the preliminary steps of performing iterative registration on a layer-by-layer basis are omitted. Thus, while certain process simplicity is obtained, it may be at the cost of the quality of the overall result, and may result in a more computationally complex alignment step.

Thus, images of the components of at least two adjacent layers are captured in the initiating step 54. Conceivably, all of the target layers could be acquired in this initial step, but it is sufficient to acquire the images of only two adjacent layers.

An initial pair-wise registration attempt is performed on each layer 56, much in the same manner as described in FIG. 3.

Afterwards, the pair-wise results are subjected to global registration 57, much in the same manner as described in FIG. 3.

Certain global registration correspondence points and alignment correspondence pairs are then identified 58, so that each registration correspondence point is found on at least two images in the same layer and that at least one image on one layer is linked with a corresponding image on another layer through an alignment correspondence pair. Those having ordinary skill in this art will readily recognize that the selection of registration correspondence points and alignment correspondence pairs could be effected in any order.

After the images are captured and the registration correspondence points and alignment correspondence pairs identified, a first attempt is made at globally registering and aligning the imaged layers of a multiple-layered image area 60 using an error minimization technique such as least squares energy minimization, or such other error minimization algorithm as may be known to those having ordinary skill in this art.

The results of the registration and alignment attempt 62 are then analysed in order to identify statistical outliers and general errors in the registration and alignment. Typically, this may be a manual visual inspection. However, the examination of the results of the registration attempt could be automated. Whichever method is used, the set of errors detected could lead to the identification of certain additional registration correspondence points between adjacent image in a layer and/or alignment correspondence pairs between corresponding images on different layers thought to be useful in increasing the accuracy of the registration and alignment attempt 58. Alternatively, certain existing registration correspondence points and/or alignment correspondence pairs may be discarded as constituting an outlier or an error.

This process of adjusting the set of registration correspondence points and alignment correspondence pairs 58, performing a global registration and alignment attempt using the adjusted set of registration correspondence points and alignment correspondence pairs 60 and inspecting the results of the registration and alignment attempt 62 could be iteratively repeated until a satisfactory level of registration and alignment is ultimately achieved.

Once these layers of images have been satisfactorily registered and aligned, the entire process is repeated for a different layer.

Examples of the process and results obtained will now be discussed.

Once all of the layers have been satisfactorily registered and aligned, the process has been completed.

Figure 6:
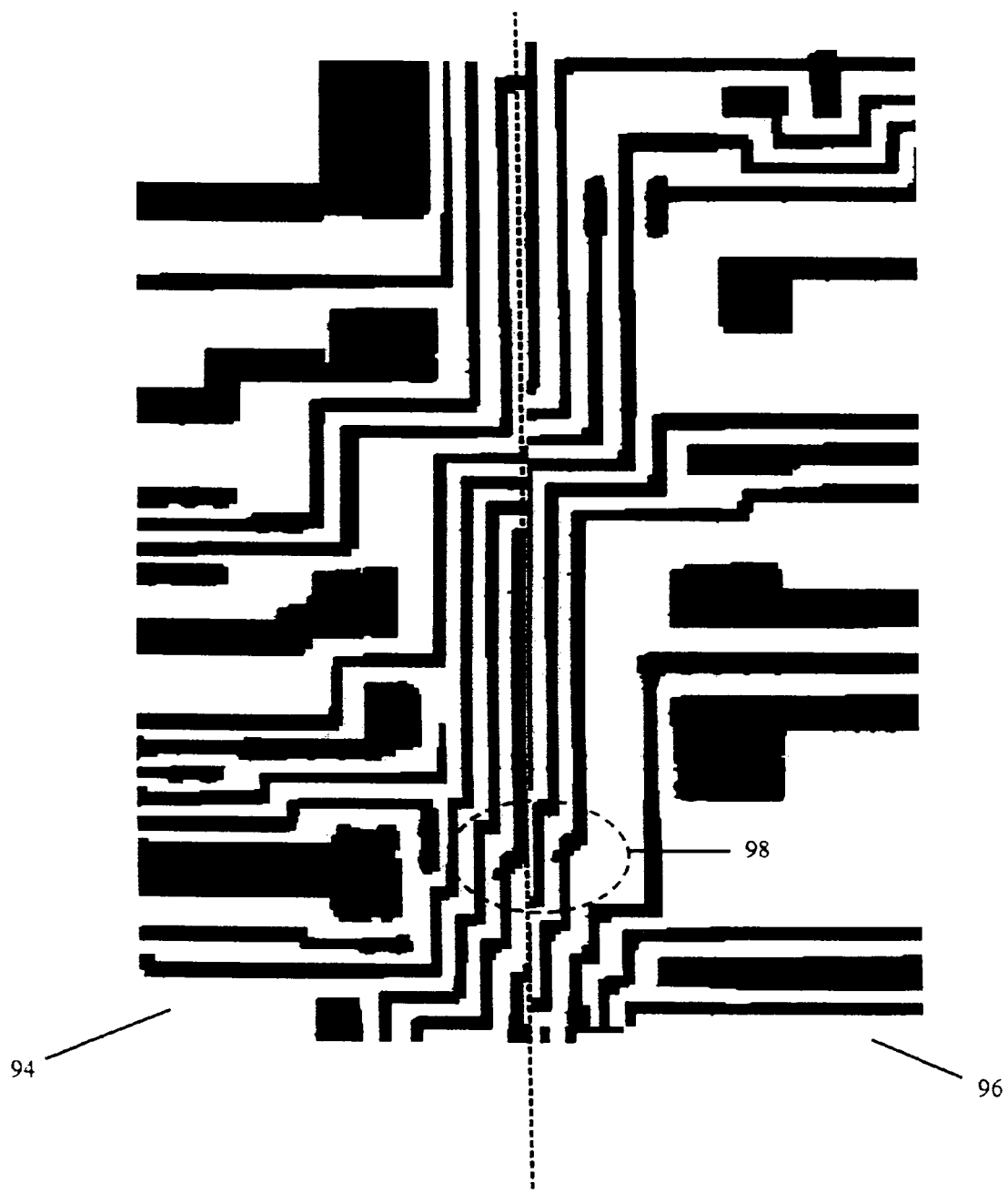
FIG. 6 is a photograph of an overlapped pair of images showing substantial registration error.

In FIG. 6, a pair of images is shown 94, 96 that have an overlap region 98 that has not been correctly registered.

Figure 7:
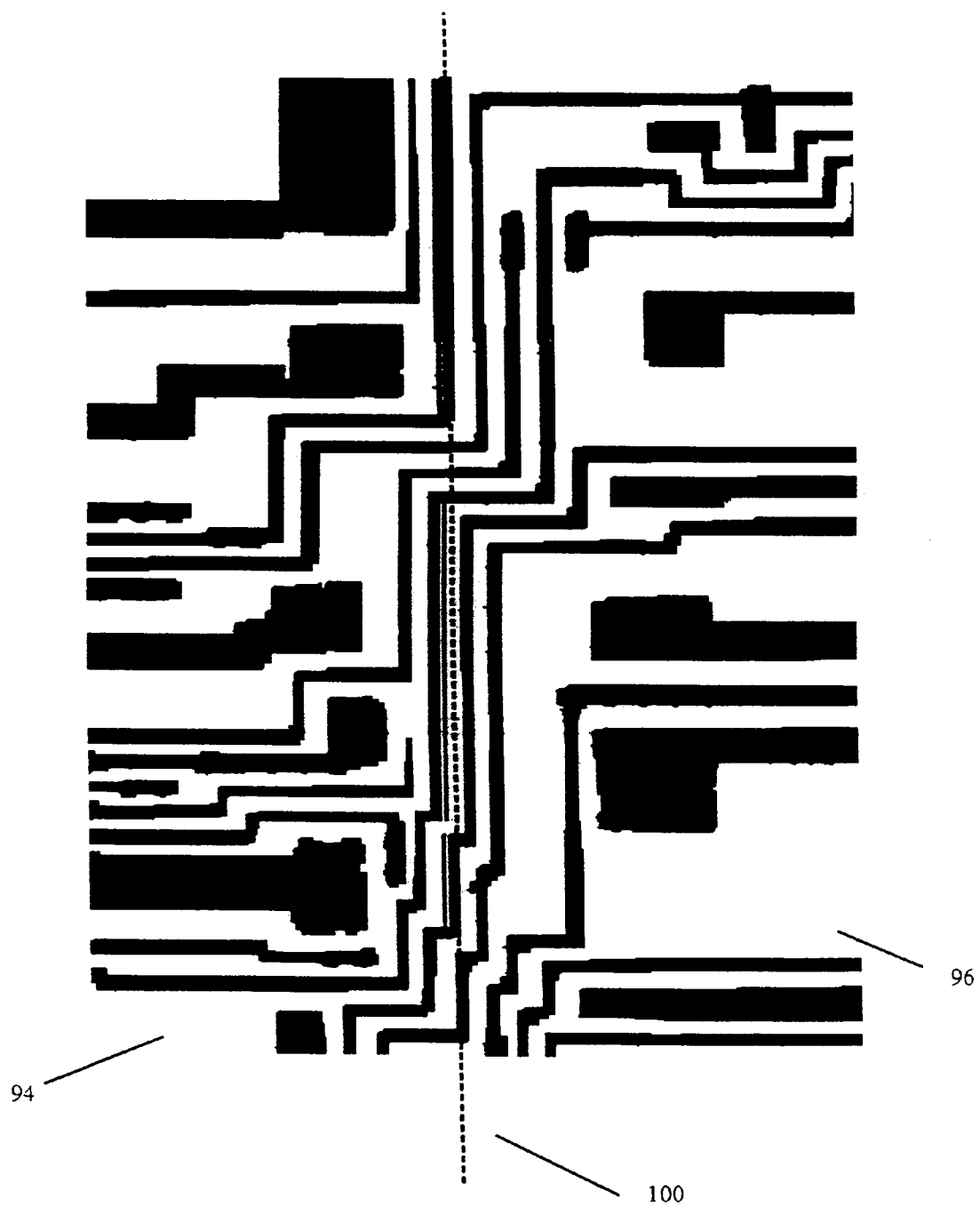
FIG. 7 is a photograph of the pair of images depicted in FIG. 6 after relative coordinates had been corrected according to the results of pair-wise image registration in accordance with the embodiment of FIG. 3.

In FIG. 7, the images from FIG. 6 are shown again 94, 96. However, the overlap regions have now been correctly registered and the seam 100, shows the transition line that can be seen from the first photo 94 to the second 96.

Figure 8:
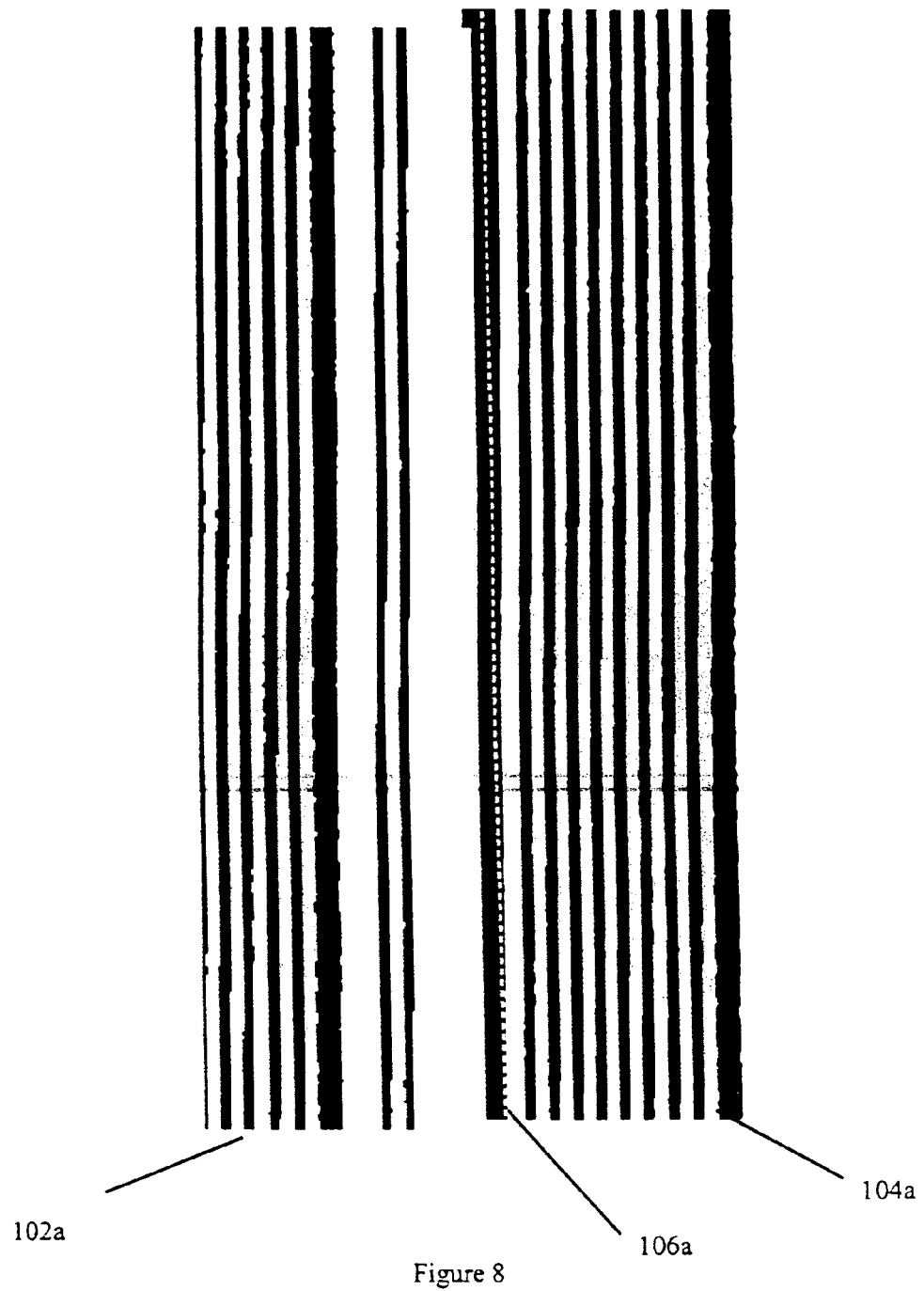
FIG. 8 is a photograph of a pair of overlapped images where the overlapped region does not contain enough information to perform pair-wise registration.

In FIG. 8, a pair of images is shown 102a and 104a that do not contain sufficient information to easily register the two images. The seam 106a between them shows the point at which the two have currently been registered.

Figure 9:
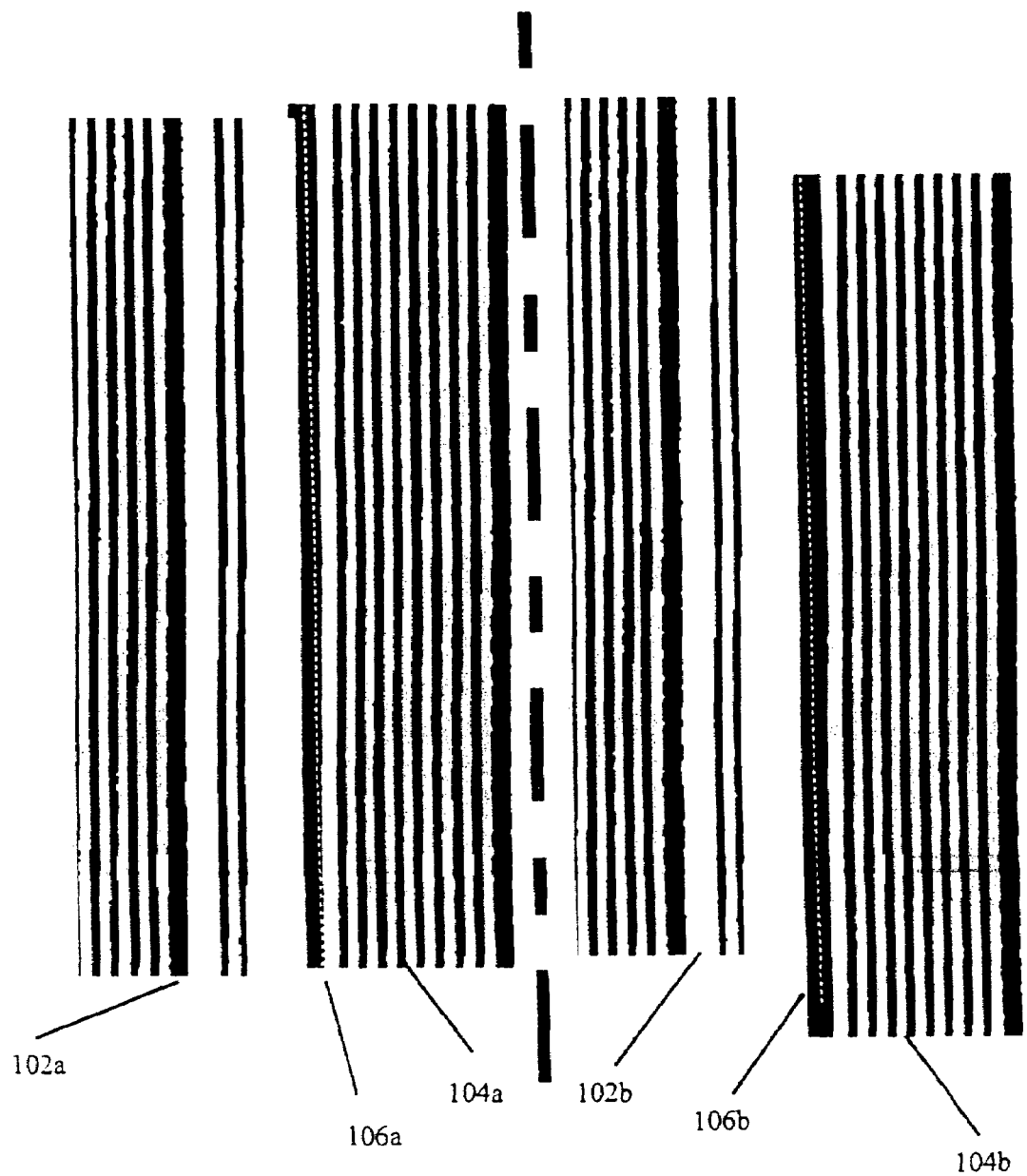
FIG. 9 is a photograph of the pair of overlapped images of FIG. 8, showing two different results of the pair-wise registration procedure.

FIG. 9 shows the pair of images as registered from FIG. 8, and the subsequent results of another registration attempt, showing the images 102b and 104b in another registration with a new seam 106b.

FIG. 10 shows four images 108, 110, 116, 114 in a registration configuration, which is missing an overlap region 112.

FIG. 11, shows a metal layer 124, with an overlaid via layer 122, which is slightly out of alignment. Some vias are located in a likely location 120, while others appear to be floating 126.

The present invention advantageously provides an efficient means to compensate for the accumulation of misalignment errors in imaging application in which two or more layers are imaged.

The present invention can be implemented in digital electronic circuitry, or in hardware, firmware, software, or in combination thereof. Apparatus of the invention can be implemented in a computer program product tangibly embodied in a machine-readable storage device for execution by a programmable processor; and methods actions can be performed by a programmable processor executing a program of instructions to perform functions of the invention by operating on input data and generating output. The invention can be implemented advantageously in one or more computer programs that are executable on a programmable system including at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and specific microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include al forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in ASICs (application-specific integrated circuits).

Figure 4:
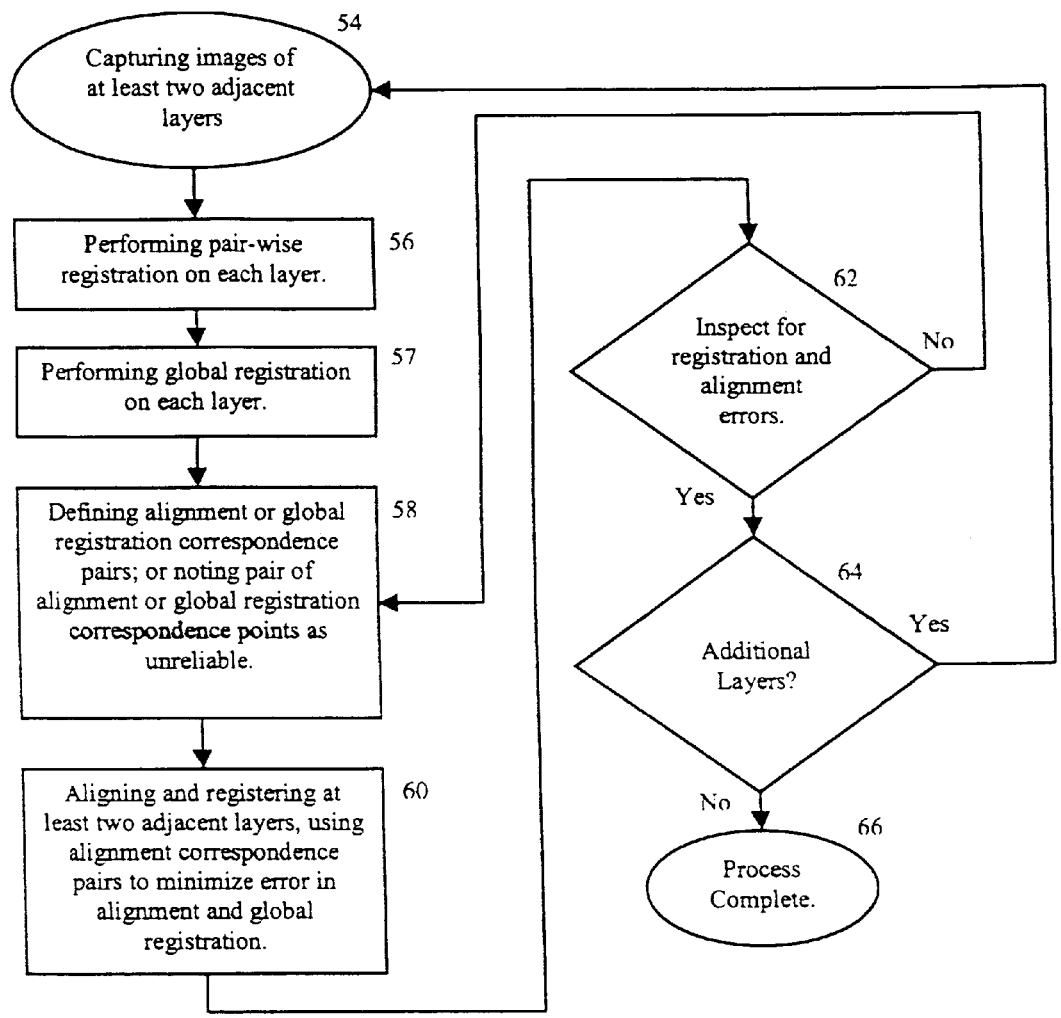
FIG. 4 is a flow chart illustrating the steps for registering a number of images into layers and aligning a number of vertical layers while searching for alignment errors, in accordance with a second aspect of the present invention.

Examples of such types of computers are programmable processing systems to implement the processing shown in FIGS. 3 and 4. The system may comprise a processor, a random access memory, a hard drive controller, and an input/output controller coupled by a processor bus.

It will be apparent to those having ordinary skill in this art that various modifications and variations may be made to the embodiments disclosed herein, consistent with the present invention, without departing from the spirit and scope of the present invention. Other embodiments consistent with the present invention will become apparent from consideration of the specification and the practice of the invention disclosed therein.

Accordingly, while the invention has been described according to what is presently considered to be the most practical and preferred embodiments, the specification and embodiments are to be considered exemplary only. Those having ordinary skill in this art will readily recognize that various modifications and equivalent structures and functions may be made without departing from the spirit and scope of the invention. Therefore, the invention must be accorded the broadest possible interpretation so as to encompass all such modifications and equivalent structures and functions, with a true scope and spirit of the invention being disclosed by the following claims.

We claim:

1. A method of creating a horizontally registered and vertically aligned multiple-layered mosaic of images of a portion of an object, comprising the steps of:
   a. for each layer of detail of the portion of the object to be imaged:
      i. capturing the detail of the layer in a series of captured images;
      ii. performing pair-wise registration of the captured images of the layer into a mosaic; and
      iii. performing global registration of the mosaic of the layer, into an optimised mosaic layer;
   b. identifying at least one alignment correspondence pair, located on an image on a first optimised mosaic layer and on at least one image on a separate optimised mosaic layer; and
   c. iteratively:
      i. performing alignment and global registration of all of the optimised mosaic layers into a substantially aligned mosaic, using the identified alignment correspondence pairs associated with each optimised mosaic layer; and
      ii. redefining the identified alignment correspondence pairs;
   until the alignment of the layers is optimized.

2. The method according to claim 1, wherein
   introducing, after step a. ii. and before step a. iii., identifying at least one registration correspondence point, associated with at least two images;
   step a. iii. comprises using the identified registration correspondence points associated with the layer during the global registration; and
   introducing, after step a. iii., redefining the identified registration correspondence points for the layer.

3. The method according to claim 2, wherein step c. ii. comprises redefining the identified registration-correspondence points.

4. The method according to claim 1, wherein the step of performing pair-wise registration of the captured images into a mosaic comprises identifying and using as a basis for registration, common gray areas on the images.

5. The method according to claim 2, wherein the step of redefining the identified registration correspondence points comprises discarding previously identified registration correspondence points as being unreliable.

6. The method according to claim 5, wherein the step of discarding previously identified registration correspondence points comprises discarding previously identified registration correspondence points as constituting outliers.

7. The method according to claim 5, wherein the step of discarding previously identified registration correspondence points comprises discarding previously identified registration correspondence points as constituting errors.

8. The method according to claim 2, wherein the step of redefining the identified registration correspondence points comprises identifying additional registration correspondence points.

9. The method according to claim 1, wherein the step of redefining the identified alignment correspondence pairs comprises discarding previously identified alignment correspondence pairs as being unreliable.

10. The method according to claim 9, wherein the step of discarding previously identified alignment correspondence pairs comprises discarding previously identified alignment correspondence pairs as constituting outliers.

11. The method according to claim 9, wherein the step of discarding previously identified alignment correspondence pairs comprises discarding previously identified alignment correspondence pairs as constituting errors.

12. The method according to claim 1, wherein the step of redefining the identified alignment correspondence pairs comprises identifying additional alignment correspondence pairs.

13. The method according to claim 1, wherein the step of capturing the detail of the layer comprises capturing the detail of a previously captured layer using a different sensor than that used for the previously captured detail of the layer.

14. The method according to claim 2, wherein the step of redefining the identified registration correspondence points comprises inspecting the results of the registration performed.

15. The method according to claim 14, wherein the step of inspecting comprises a manual visual inspection of the mosaicked images of the layer.

16. The method according to claim 14, wherein the step of inspecting comprises a computer-assisted inspection of the mosaicked images of the layer.

17. The method according to claim 14, wherein the step of inspecting comprises calculating and assigning a minimum energy function to error in the registration performed.

18. The method according to claim 17, wherein the step of calculating and assigning a minimum energy function comprises applying a least squares energy minimization algorithm.

19. The method according to claim 18, wherein the step of applying a least squares energy minimization algorithm comprises the steps of:
   grouping data concerning registration error into a plurality of groups according to reliability;
   minimizing weighted least squares energy value obtained from application of the least squares energy minimizing algorithm, taking into account the most reliable group; and
   minimizing energy value obtained from application of the least squares energy minimizing algorithm in the least reliable groups while minimizing any increase in the energy value of the most reliable group.

20. The method according to claim 17, wherein the step of calculating and assigning a minimum energy function comprises applying a 95% order statistical energy function.

21. The method according to claim 1, wherein the step of performing alignment comprises the use of global image registration.

22. The method according to claim 1, wherein the step of redefining the identified alignment correspondence pairs comprises inspecting the results of the registration performed.

23. The method according to claim 22, wherein the step of inspecting comprises a manual visual inspection of the mosaicked images of the layers being aligned.

24. The method according to claim 22, wherein the step of inspecting comprises a computer-assisted inspection of the mosaicked images of the layers being aligned.

25. The method according to claim 22, wherein the step of inspecting comprises calculating and assigning a minimum energy function to error in the alignment performed.

26. The method according to claim 25, wherein the step of calculating and assigning a minimum energy function comprises applying a least squares energy minimization algorithm.

27. The method according to claim 26, wherein the step of applying a least squares energy minimization algorithm comprises the steps of:
  a. grouping data concerning registration error into a plurality of groups according to reliability;
  b. minimizing weighted least squares energy value obtained from application of the least squares energy minimizing algorithm, taking into account the most reliable group; and
  c. minimizing energy value obtained from application of the least squares energy minimizing algorithm in the least reliable groups while ensuring no increase in the energy value of the most reliable group.

28. The method according to claim 25, wherein the step of calculating and assigning a minimum energy function comprises applying a 95% order statistical energy function.

29. A method of creating a horizontally registered and vertically aligned multiple-layered mosaic of images of an object, comprising the steps of:
  a. Capturing the detail of each of the layers in a series of images;
  b. Performing pair-wise registration of the captured images of each of the layers into a mosaic;
  c. for a plurality of layers of detail of the object to be imaged:
    i. identifying at least one registration correspondence point, each associated with two images, and identifying at least one alignment correspondence pair, located on an image on a first layer and on at least one image on a different one of the plurality of layers;
    ii. iteratively:
      a) performing global registration of the captured images of each of the plurality of layers into a mosaic, using the identified registration correspondence points for the layer and performing alignment of all of the plurality of layers into a mosaic, using the identified alignment correspondence pairs;
      b) redefining the identified registration correspondence points for each of the plurality of layers and the identified alignment correspondence pairs;
    until the registration and alignment of the plurality of layers is optimised; and
    iii. adding at least one layer to the plurality of layers;
  until the alignment of all of the layers of detail of the portion of the object is imaged and optimized.

30. The method according to claim 29, wherein the step of performing pair-wise registration of the captured images into a mosaic is performed before the iteration step.

31. The method according to claim 29, wherein said identifying at least one registration correspondence point is followed by said identifying at least one alignment correspondence pair.

32. The method according to claim 29, wherein said identifying at least one alignment correspondence pair is followed by said identifying at least one registration correspondence point.

33. The method according to claim 29, wherein the step of redefining the identified registration correspondence points comprises discarding previously identified registration correspondence points as being unreliable.

34. The method according to claim 33, wherein the step of discarding previously identified registration correspondence points comprises discarding previously identified registration correspondence points as constituting outliers.

35. The method according to claim 33, wherein the step of discarding previously identified registration correspondence points comprises discarding previously identified registration correspondence points as constituting errors.

36. The method according to claim 29, wherein the step of redefining the identified registration correspondence points comprises identifying additional registration correspondence points.

37. The method according to claim 29, wherein the step of redefining the identified alignment correspondence pairs comprises discarding previously identified alignment correspondence pairs as being unreliable.

38. The method according to claim 37, wherein the step of discarding previously identified alignment correspondence pairs comprises discarding previously identified alignment correspondence pairs as constituting outliers.

39. The method according to claim 37, wherein the step of discarding previously identified alignment correspondence pairs comprises discarding previously identified alignment correspondence pairs as constituting errors.

40. The method according to claim 29, wherein the step of redefining the identified alignment correspondence pairs comprises identifying additional alignment correspondence pairs.

41. A method of creating a horizontally registered and vertically aligned multiple-layered mosaic of images of a portion of an object, comprising the steps of:
  (a) for each layer of detail of the portion of the object to be imaged;
    (i) capturing the detail of the layer in a series of captured images;
    (ii) performing pair-wise registration of the captured images of the layer into a mosaic;
    (iii) identifying at least one registration correspondence point, associated with at least two images;
    (iv) performing global registration of the mosaic of the layer, into an optimized mosaic layer using the identified registration correspondence points associated with the layer; and
    (v) redefining the identified registration correspondence points for the layer;
  (b) identifying at least one alignment correspondence pair, located on an image of a first optimised mosaic layer and on at least one image on a separate optimized mosaic layer; and
  (c) iteratively:
    (i) performing alignment and global registration of all of the optimised mosaic layers into a substantially aligned mosaic, using the identified alignment correspondence pairs associated with each optimized mosaic layer; and (ii) redefining the identified alignment correspondence pairs and the identified registration correspondence points;

until the alignment of the layers is optimized.

* * * * *